United States Patent [19]

Krumböck et al.

[11] 3,980,758

[45] Sept. 14, 1976

[54] PROCESS FOR THE COMBUSTION OF CHLORINE CONTAINING WASTES

[75] Inventors: Reinhard Krumböck, Altötting; Wenzel Kühn, Burgkirchen, Alz, Germany

[73] Assignee: Hoechst Aktiengesellschaft, Frankfurt am Main, Germany

[22] Filed: Apr. 29, 1975

[21] Appl. No.: 572,755

Related U.S. Application Data

[63] Continuation of Ser. No. 424,715, Dec. 14, 1973, abandoned.

[30] Foreign Application Priority Data

Dec. 22, 1972 Germany............................ 2262875

[52] U.S. Cl.................................. 423/481; 423/488
[51] Int. Cl.².......................................... C01B 7/08
[58] Field of Search........................... 423/481, 488

[56] References Cited
UNITED STATES PATENTS

| | | | |
|---|---|---|---|
| 1,906,467 | 5/1933 | Heath | 423/481 |
| 3,387,430 | 6/1968 | Savardi, Jr. | 423/481 X |
| 3,589,864 | 6/1971 | Ezaki | 423/481 |

FOREIGN PATENTS OR APPLICATIONS

| | | | |
|---|---|---|---|
| 490,323 | 2/1953 | Canada | 423/481 |
| 569,804 | 1/1959 | Canada | 423/481 |

*Primary Examiner*—Edward Stern
*Attorney, Agent, or Firm*—Connolly and Hutz

[57] ABSTRACT

A process for the combustion of chlorine containing residues and wastes with simultaneous recovery of the hydrogen chlorine thereby obtained, which comprises burning the chlorine containing residues with an excess of air and simultaneous addition of azeotropically boiling hydrochloric acid formed in the work-up of the combustion gases.

2 Claims, 1 Drawing Figure

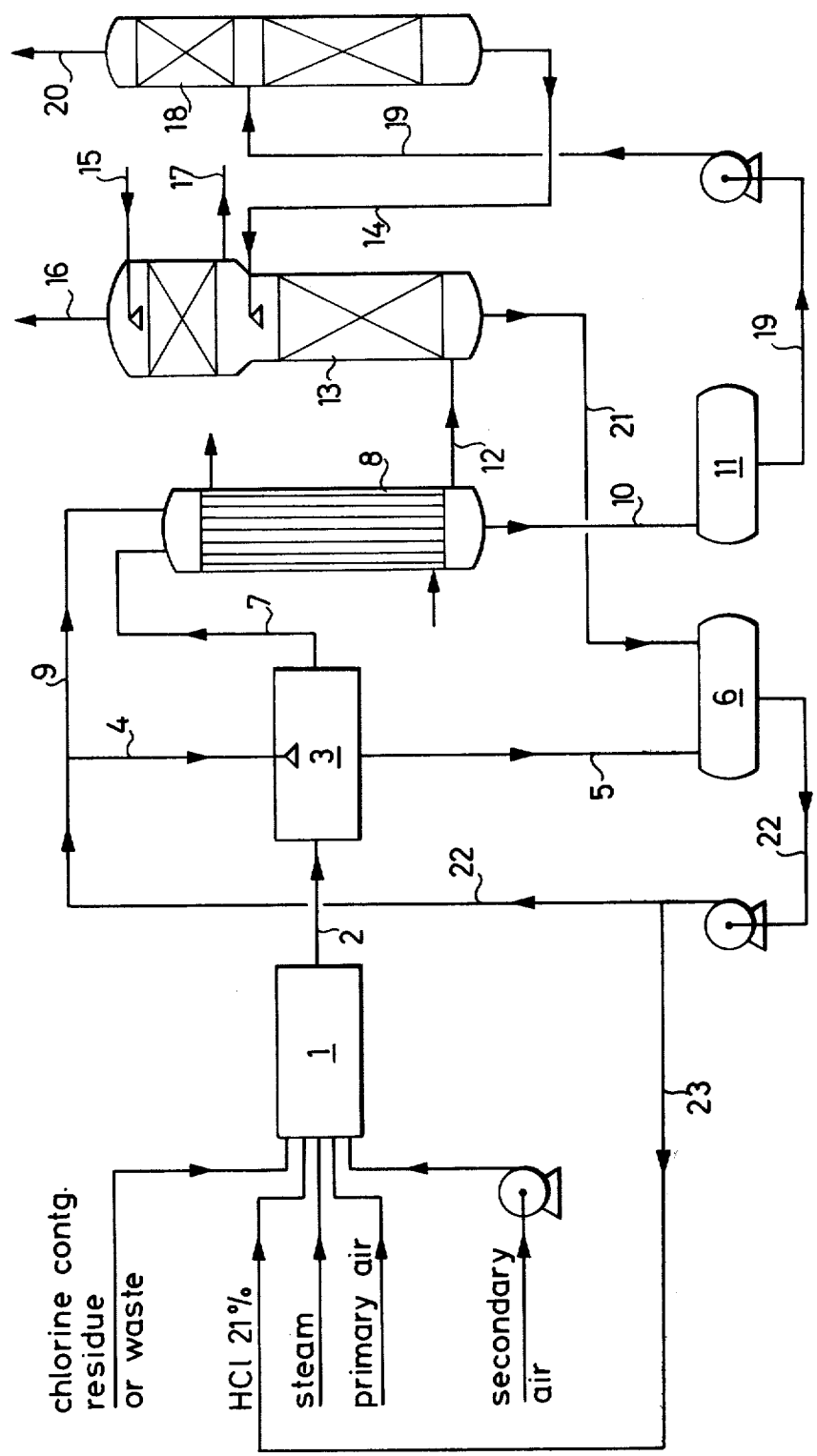

PROCESS FOR THE COMBUSTION OF CHLORINE CONTAINING WASTES

This application is a continuation of application Ser. No. 424,715, filed Dec. 14, 1973 and now abandoned.

The present invention relates to a process for the combustion of chlorine containing residues and wastes with simultaneous recovery of the hydrogen chlorine thereby obtained, which comprises burning the chlorine containing residues, at temperatures of from 600° to 1500°C, preferably from 1000° to 1200°C, with an excess of air and simultaneous addition of azeotropically boiling hydrochloric acid formed in the work-up of the combustion gases.

When chlorine containing residues and wastes are burned, hydrogen chloride is formed which, for reasons of pollution prevention, has to be removed from the combustion gases and, if desired, may be recovered.

The combustion of such residues is usually carried out in combustion chambers at temperatures above 600°C. In order not to exceed the temperature admissible with respect to the construction materials used in the case of relatively small combustion chambers, cooling water is injected into the combustion zone simultaneously with the wastes and the air for combustion. The accompanying drawing shows such a combustion plant; and its operation mode is as follows:

The hot combustion gases leaving the combustion chamber 1 are forwarded, via duct 2, to a quenching chamber 3, where they are cooled to 90°C by means of azeotropic HCl fed in via duct 22, 4 and let off via duct 5 into a reservoir 6. Subsequently, the gas is forwarded, via duct 7, to an absorber 8 and washed there with azeotropic hydrochloric acid fed in via duct 22, 9. In this operation, the greater part of the hydrogen chloride contained in the combustion gases is absorbed by the hydrochloric acid (its hydrogen chloride content thus being concentrated to about 30%), which is let off via duct 10 into a reservoir 11. The gases are forwarded from absorber 8 via duct 12 into a counter-current scrubber 13, where they are again washed with azeotropic hydrochloric acid — duct 14 — and then with pure water - duct 15. The gases leave the scrubber column as waste gas via duct 16, and the washing water used in scrubber 13 leaves it via duct 17.

The hydrogen chloride contained in the 30% hydrochloric acid obtained in absorber 8 and stocked in reservoir 11 is recovered in desorber 18; the hydrochloric acid being fed in via duct 19. At the top of the desorber, hydrogen chloride is taken off via duct 20. In the sump of the desorber, azeotropic hydrochloric acid is collected, which is then forwarded via duct 14 to scrubber column 13, from where it is discharged via duct 21 into reservoir 6.

Since, according to the state of the art, water was continuously injected into the combustion chamber 1, of course large amounts of azeotropic hydrochloric acid were formed which were collected in the sump of desorber 18 and stocked in reservoir 6. Generally, there was no practical application for these amounts which, apart from the portion forwarded via duct 22 to quenching chamber 3 and absorber 8, were discharged into the sewage.

Thus, large amounts of hydrogen chloride are lost without any practical use, and additional chemicals are even required to make them innoxious for the sewage.

It has now been found that it is possible to avoid the continuous formation of azeotropic hydrochloric acid by introducing the azeotropic hydrochloric acid collected in the sump of absorber 18 and stocked in reservoir 6, instead of water, into combustion chamber 1 via duct 23, thus recovering nearly all hydrogen chloride obtained in the combustion and making possible its profitable reuse, while simultaneously contributing to a decontamination of the sewage from chemicals.

On account of the inferior vaporization and specific heat of azeotropic hydrochloric acid as compared to pure water, for the same cooling effect the about 1.17 fold amount relative to pure water has to be introduced into the combustion chamber. Depending on the strain put on the fire zone and the calorific value of the material which has to be burned, about 1 to 2 kg of azeotropic hydrochloric acid per kg of wastes are required.

The operation made according to the present invention ensures that only that amount of hydrogen chloride in the form of azeotropic hydrochloric acid is lost which is formed with the aid of the water developing during the combustion of the excess hydrogen in the wastes to be burned.

A further advantage of the process of the invention resides in the fact that, in case of an increase of the throughput of the residues to be burned, the increased amount of cooling medium required for heat technology reasons does not cause an increased production of low percentage hydrochloric acid or losses of hydrogen chloride.

The following examples illustrate the invention.

EXAMPLE 250 kg/h of chlorine containing wastes composed as follows:

| | |
|---|---|
| C | 30.0 weight % |
| H | 3.7 weight % |
| Cl | 65.0 weight % |
| O | 1.1 weight % |
| remainder | 0.2 weight % | are reacted for several days in a combustion chamber at about 1150°C with a small excess of air and about 292 l/h of azeotropic hydrochloric acid, and worked up in the manner described above in a plant as shown in the accompanying drawing.

Of the 37 g of hydrogen contained in 1 kg of the wastes, 18.4 g react with 650 g of chlorine to yield 668.4 g of hydrogen chloride.

COMPARATIVE EXAMPLE

When operating as described above, but injecting 1 kg of water per kg of wastes (instead of azeotropic hydrochloric acid), $$\frac{0.21}{1 - 0.21} = 0.2658 \text{ kg}$$

of HCl per kg of wastes are lost in azeotropic form, which are $$\frac{0.2658}{0.6684} \cdot 100 = 40 \%$$

of the hydrogen chloride formed.

What is claimed is:

1. A process for the combustion of chlorine-containing residues or wastes with simultaneous recovery of the hydrogen chloride gas formed by said combustion, which comprises:
    a. burning the chlorine-containing residues or wastes at temperatures of from 600° to 1500°C in a combustion zone in the presence of excess air,
    b. simultaneously with said burning injecting azeotropic hydrochloric acid into the combustion zone and cooling same,
    c. washing the hydrogen chloride gas-containing combustion gases with azeotropic hydrochloric acid whereby the hydrogen chloride gas is absorbed by the azeotropic hydrochloric acid yielding hydrochloric acid of higher than azeotropic concentration,
    d. recovering hydrogen chloride gas and azeotropic hydrochloric acid from the hydrochloric acid of higher than azeotropic concentration, and
    e. recycling the recovered azeotropic hydrochloric acid to steps (b) and (c) above.

2. The process of claim 1 wherein the temperature of step (a) is 1000°–1200°C.

* * * * *